United States Patent [19]

Takeshima

[11] Patent Number: 5,779,329
[45] Date of Patent: Jul. 14, 1998

[54] EMERGENCY BRAKE SYSTEM SENSING PEDAL SPEED AND PRESSURE

[75] Inventor: Sadao Takeshima, Higashimatsuyama, Japan

[73] Assignee: Jidosha Kiki Co., Ltd., Tokyo, Japan

[21] Appl. No.: 652,937

[22] Filed: May 24, 1996

[30] Foreign Application Priority Data

Jun. 8, 1995 [JP] Japan .................................. 7-141802

[51] Int. Cl.[6] ...................................................... B60T 13/58
[52] U.S. Cl. ...................... 303/155; 303/113.4; 303/114.3
[58] Field of Search ............................. 303/113.4, 155, 303/114.3, DIG. 3

[56] References Cited

U.S. PATENT DOCUMENTS 5,152,587  10/1992  Volz .................................. 303/114.3
5,158,343  10/1992  Reichelt et al. ..................... 303/113.4
5,230,549   7/1993  Osada et al. ...................... 303/113.4 X
5,235,897   8/1993  Watanabe ............................ 91/376 R
5,375,917  12/1994  Inagaki et al. ................... 303/113.4 X

FOREIGN PATENT DOCUMENTS

4028290      1/1992  Germany ............................. 303/113.4
40-4232154   8/1992  Japan ................................. 303/113.4

Primary Examiner—Peter M. Poon
Attorney, Agent, or Firm—Kanesaka & Takeuchi

[57] ABSTRACT

An electronic controller of the invention judges whether the pedaling speed exceeds a threshold and a pedal pressure exceeds a threshold based on detected signals from a stroke sensor and a pressure sensor. When the electronic controller judges that the pedaling speed exceeds the threshold and the pedal pressure exceeds the threshold, comparators output signals to actuate a switch. Thus, a braking force for emergency braking is outputted.

14 Claims, 6 Drawing Sheets

EMERGENCY BRAKE SYSTEM SENSING PEDAL SPEED AND PRESSURE

BACKGROUND OF THE INVENTION

The present invention relates to a brake system which enables an increased braking force to be outputted when the braking force corresponding to the pedal pressure by a driver is not sufficient for, for example, emergency braking.

In a brake system for a vehicle such as a passenger car, a vacuum booster is used to actuate a master cylinder upon increasing pedal pressure in order to output a large braking force which is never outputted only by pedal pressure from a brake pedal or to reduce a driver's operational force.

In such a brake system, however, in case of emergency braking with high risk of vehicle collision, since a valve opening rate of a control valve of the vacuum booster is not enough even if the driver pedals fully, the introduction of air is limited not to allow the vacuum booster to drive the master cylinder to output a force necessary for emergency braking. Particularly, a beginner who is not accustomed to driving a vehicle can not pedal fully to the maximum so that the master cylinder never output a force necessary for emergency braking.

Accordingly, a brake system which detects the pedaling speed and/or the changing rate of pedal pressure, determines that a brake pedal is pedaled for emergency braking when the pedaling speed and/or the changing rate of pedal pressure exceed respective predetermined values, and forcibly develops a braking force not proportionally with the actual pedal pressure at the brake pedal is proposed in Japanese Unexamined Published Patent Application No. 6-179361.

In the brake system of '361, an electronic control device determines whether the brake pedal is pedaled for service braking or emergency braking based on the pedaling speed and/or the changing rate of pedal pressure, and when the electronic control device determines that the brake pedal is pedaled for emergency braking, a solenoid valve is actuated to forcibly develops a braking force not proportionally with the actual pedal pressure at the brake pedal.

This brake system enables the maximum braking force to be securely developed for the emergency braking even if the control valve of the vacuum booster is low in the valve opening rate or the driver is a beginner.

On the other hand, a veteran driver who is an expert driver always quickly starts pedaling to quickly pass the range of loss stroke even for service braking.

Since the brake system of '361 forcibly develops a braking force based on the detected pedaling speed not relative to the brake pressure, it is likely to forcibly develop an undesirable braking force because the electronic control device determines that the brake pedal is pedaled for emergency braking upon detecting a high pedaling speed for passing the range of loss stroke for normal driving. Similarly, in case where the brake system forcibly develops braking force based on the detected changing rate of the pedal pressure not relative to the brake pressure, it is likely to forcibly develop an undesirable braking force when the driver pedals to develop higher pedal pressure during service braking.

As described above, the conventional brake system does not always correctly determine whether the brake pedal is pedaled by the driver for service braking or emergency braking.

SUMMARY OF THE INVENTION

The object of the present invention is to provide a brake system which enables more precise determination of emergency braking so as to correctly develop braking pressure for emergency braking.

For accomplishing the object, a brake system of the invention comprises: a brake controlling member; a vacuum booster comprising a constant pressure chamber inside of which is always vacuumed by a vacuum source, a variable pressure chamber inside of which is vacuumed when a brake is in non-operation and into which atmospheric air is introduced when the brake is in operation, a diaphragm which separates the constant pressure chamber and the variable pressure chamber and is actuated by the atmospheric air introduced in the variable pressure chamber, an inner chamber inside of which is normally vacuumed and into which atmospheric air is introduced alternatively if necessary, a control valve which is controlled by the brake controlling member so that the variable pressure chamber is allowed to communicate with the inner chamber and not allowed to communicate with the atmospheric air when the brake is in non-operation, and the variable pressure chamber is allowed to communicate with the atmospheric air and not allowed to communicate with the inner chamber when the brake is in operation, and an output shaft which is actuated by the diaphragm, a master cylinder which is actuated by the output shaft of the vacuum booster to develop brake fluid pressure; brake cylinders into which the brake fluid pressure of the master cylinder is introduced to a produce a braking force; a first path which is communicated with the inner chamber; a pressure switching valve which normally allows the first path to communicate with the vacuum source and allows the first path to communicate with the atmospheric air if necessary; a second path for introducing the atmospheric air passing through the first path to the variable pressure chamber; a check valve which is disposed on the way of the second path to allow the flow of air from the first path to the variable pressure chamber and not allow the flow of air from the variable pressure chamber to the first path; a displacement sensor for detecting the displacement of the brake controlling member; a force sensor for detecting the operating force exerted on the brake controlling member; and an electronic controller for operating the pressure switching valve when an operating speed computed based on the displacement detected by the displacement sensor is greater than a predetermined speed threshold and the operating force detected by the force sensor is greater than a predetermined force threshold, wherein the electronic controller operates the pressure switching valve to allow the first path to communicate with the atmospheric air when emergency braking is required so as to increase the braking force.

In the present invention, the speed threshold comprises a plurality of thresholds to respond to the traveling range of the brake controlling member.

In the present invention, the force threshold comprises a first force threshold as a reference value for the electronic controller to operate the pressure switching valve and a second force threshold as a reference value for the electronic controller to cancel the operation of the pressure switching valve.

In the present invention, the force threshold comprises a first force threshold as a reference value for the electronic controller to operate the pressure switching valve and a second force threshold as a reference value for the electronic controller to cancel the operation of the pressure switching valve.

The present invention further comprises a cancel switch connected to the electronic controller for canceling the operation of the electronic controller, wherein an operational signal outputted from the cancel switch to the electronic controller determines whether the electronic controller is actuated or not.

The present invention further comprises an indicator for indicating that the electronic controller operates the pressure switching valve.

In the brake system of the present invention as structured above, in case of service braking, the vacuum booster produces an output by atmospheric air introduced into the variable pressure chamber through the control valve opened by traveling the brake controlling member with a normal operational force. At this point, the atmospheric air introduced in the variable pressure chamber is about to flow out through the second path. However, since a check valve disposed on the way of the second path securely prevents the atmospheric air in the variable pressure chamber from flowing out, the vacuum booster outputs without losing pressures so that the pedal pressure is increased at a predetermined servo ratio by the vacuum booster. The master cylinder is actuated by the output of the vacuum booster to develop brake fluid pressure which is supplied to the brake cylinders. In this manner, the service braking is actuated.

The electronic controller operates the pressure switching valve to allow the first path to communicate with the atmospheric air when the electronic controller decides that the operating speed computed based on the displacement detected by the displacement sensor is greater than the predetermined speed threshold and the operating force detected by the force sensor is greater than a predetermined force threshold. As a result of this, the variable pressure chamber of the vacuum booster is communicated with the atmospheric air through the second path and the first path without limitation. Therefore, the pressure in the variable pressure chamber is increased at a rate higher than the rate corresponding to the pedaling speed so that the output of the vacuum booster is increased. That is, when the brake controlling member is operated quickly with a large operating force, the operating force is increased to output a desired braking force.

According to the present invention, the electronic controller is provided with a plurality of speed thresholds to respond to the traveling range of the brake controlling member. Even if the operational speed changes according to the traveling range of the brake controlling member, the controller can more accurately control the pressure switching valve corresponding to the changes of the operational speed. Therefore, even a driver who can not pedal the brake pedal fully to the maximum since the reaction force is increased as the traveling range is larger can securely outputs a braking force for emergency braking.

Accordingly, the driver can judge, if the service braking is changed to emergency braking, thereby improving its adaptability.

According to the present invention, after emergency braking, when the operational force is less than the second force threshold by reducing the operational force on the brake controlling member, the electronic controller returns the pressure switching valve to the non-operating state. Even when the brake controlling member is still in operation, the emergency braking can be securely canceled when the operating force exerted on the brake controlling member is less than the second operating force threshold. Therefore, the braking feeling is improved so that even a veteran driver operates the brake controlling member without incommodity.

According to the present invention, the driver can select the operable state or the canceled state of the forced braking by operating the cancel switch, thereby enabling the brake control according to the driver's will. It can provide safer brake system which enables conformance with the technique of the driver.

Furthermore, according to the present invention, the driver can know whether the forced braking is operable or not because the indicator indicates the operable state of the forced braking.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
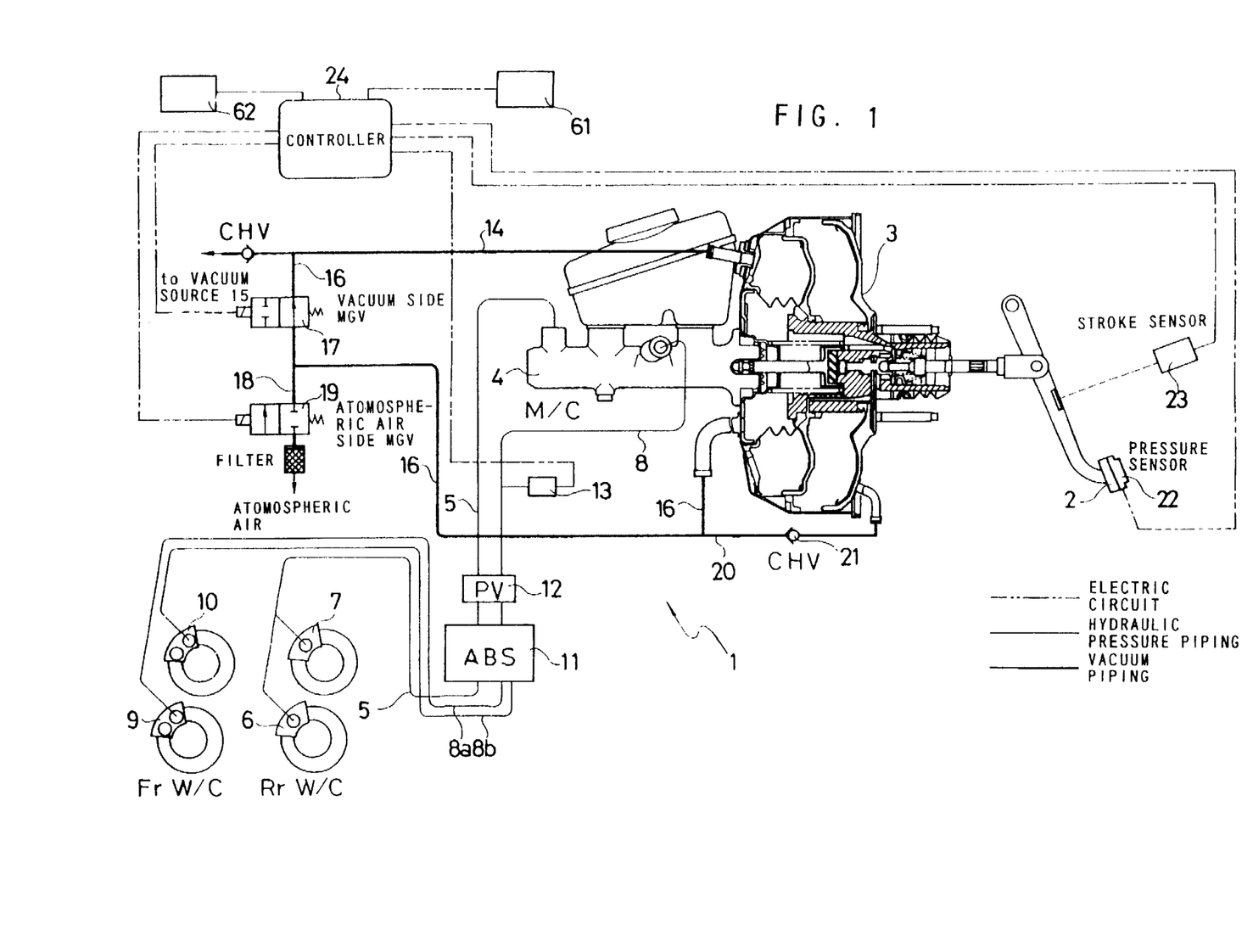
FIG. 1 is a view showing one embodiment of a brake system according to the present invention.

As shown in FIG. 1, a brake system of this embodiment comprises a brake pedal 2 as a brake controlling member of the present invention, a vacuum booster 3 of a tandem type which is actuated by traveling of the brake pedal 2 during service braking, a tandem master cylinder which develops brake fluid pressure in two fluid chambers thereof according to the output of the vacuum booster 3, wheel cylinders 6, 7 for right and left rear wheels, respectively, to which the brake fluid pressure developed in one of the fluid chambers of the tandem master cylinder 4 is supplied by way of a fluid pressure line 5, wheel cylinders 9, 10 for right and left front wheels, respectively, to which the brake fluid pressure developed in the other fluid chamber of the tandem master cylinder is supplied by way of a fluid pressure line 8, an anti-skid brake system 11 (hereinafter, referred to as "ABS") disposed on the way of the fluid pressure lines 5, 8, a proportioning valve (PV) 12 disposed on the way of the fluid pressure lines 5, 8 between the tandem master cylinder 4 and the ABS 11, a vacuum source 15 for providing vacuum to the vacuum booster 3 through a vacuum line 14, a first variable pressure line 16 (a first path of the present invention) diverged from the vacuum line 14 to selectively provide either vacuum from the vacuum source 15 or atmospheric air, a first switching valve 17 (a pressure switching valve of the present invention) which is a normally open solenoid valve disposed on the way of the first variable pressure line 16, a second variable pressure line 18 for allowing atmospheric air to flow into the first variable pressure line 16 between the first switching valve 17 and the vacuum booster 3, a second switching valve 19 (the pressure switching valve of the present invention) which is a normally closed solenoid valve disposed on the way of the second variable pressure line 18, a third variable pressure line 20 (a second path of the present invention) diverged from the first variable pressure line 16 and communicated with the vacuum booster 3, a check valve 21 disposed on the way of the third variable pressure line 20 to only flow from the first variable pressure line 16 to the vacuum booster 3, a pressure sensor 22 disposed on the brake pedal 2 to detect the pedal pressure at the brake pedal 2, a stroke sensor 23 for detecting the traveling range of the brake pedal 2, and a controller 24 for receiving a pedal pressure detecting signal from the pressure sensor 22 and a pedal stroke detecting signal from the stroke sensor 23 and for outputting a control signal to the first and second switching valves 17, 19. The fluid pressure line 8 is branched into two fluid pressure lines 8a, 8b for respective right and left wheels at the ABS 11.

Figure 2:
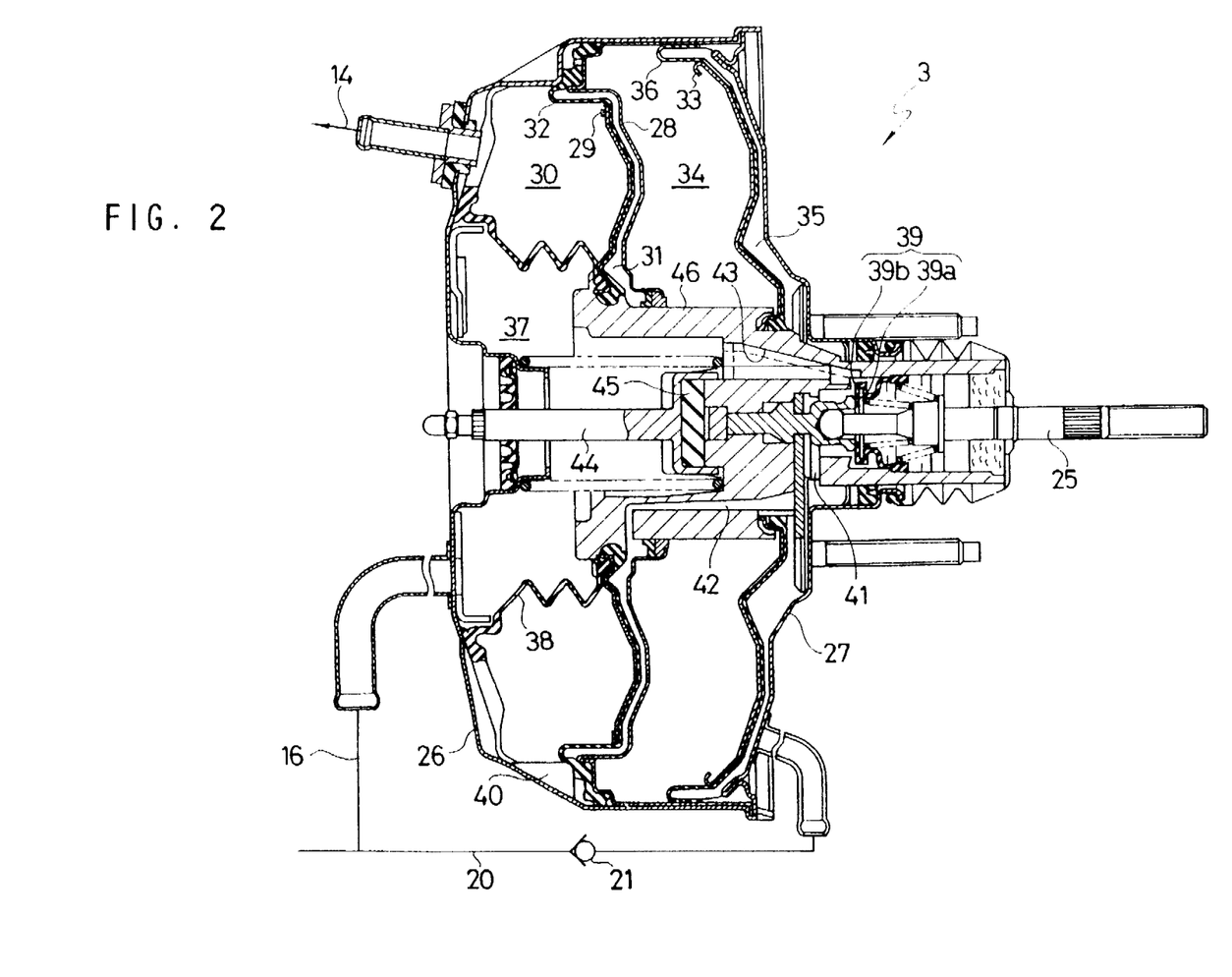
FIG. 2 is a sectional view showing a brake booster used in the brake system of the embodiment shown in FIG. 1.

As shown in FIG. 2, the vacuum booster 3 is one of conventional tandem vacuum boosters comprising an input shaft 25 connected to the brake pedal 2, a center plate 28 dividing an inner space formed between a front shell 26 and a rear shell 27 into a front chamber and a rear chamber, a front power piston 29 disposed in the front chamber, a front diaphragm 32 disposed behind the front power piston 29 and dividing the front chamber into a front constant pressure chamber 30 and a front variable pressure chamber 31, a rear power piston 33 disposed in the rear chamber, a rear diaphragm 36 disposed behind the rear power piston 33 and dividing the a rear chamber into a rear constant pressure chamber 34 and a rear variable pressure chamber 35, bellows 38 disposed in the front constant pressure chamber 30 to form an inner chamber 37, a control valve 39 which is controlled by the forward movement of the input shaft 25 and comprises an air valve 39a which is closed when the brake is in non-operation and opened by the forward movement of the input shaft 25 and a vacuum valve 39b which is opened when the brake is in non-operation and closed by the forward movement of the input shaft 25, a constant pressure path 40 disposed outside a bead portion of the front diaphragm 32 for always allowing communication between the front constant pressure chamber 30 and the rear constant pressure chamber 34, a fourth variable pressure path 41 always allowing communication between a ring-like space, formed between the air valve 39a and the vacuum valve 39b, and the rear variable pressure chamber 35, a fifth variable pressure path 42 always allowing communication between the front variable pressure chamber 31 and the rear variable pressure chamber 35, a sixth variable pressure path 43 always allowing communication between the inner chamber 37 and a ring-like space formed outside of the vacuum valve 39b, an output shaft 44 actuating the piston of the master cylinder 4, and a reaction disc 45 transmitting a reaction force of the output of the output shaft 44 to the input shaft 25.

The front constant pressure chamber 30 is communicated with the vacuum line 14 so that the front constant pressure chamber 30 is always vacuumed by the vacuum source 15. The constant pressure chamber 34 is also always vacuumed by the vacuum in the front constant pressure chamber 30 through the constant pressure path 40. The inner chamber 37 inside the bellows 38 is communicated with the first variable pressure line 16 so that the inner chamber 37 is vacuumed by the vacuum source 15 when the first switching valve 17 is opened and the second switching valve 19 is closed, and the inner chamber 37 is filled with atmospheric air when the first switching valve 17 is closed and the second switching valve 19 is opened. In addition, the rear variable pressure chamber 35 is communicated with the third variable pressure line 20. When the first switching valve 17 is opened and the second switching valve 18 is closed, the check valve 21 prevents the rear variable pressure chamber 35 from being vacuumed by the vacuum source 15. When the first switching valve 17 is closed and the second switching valve 18 is opened, the variable pressure chamber 35 is filled with atmospheric air.

Figure 3:
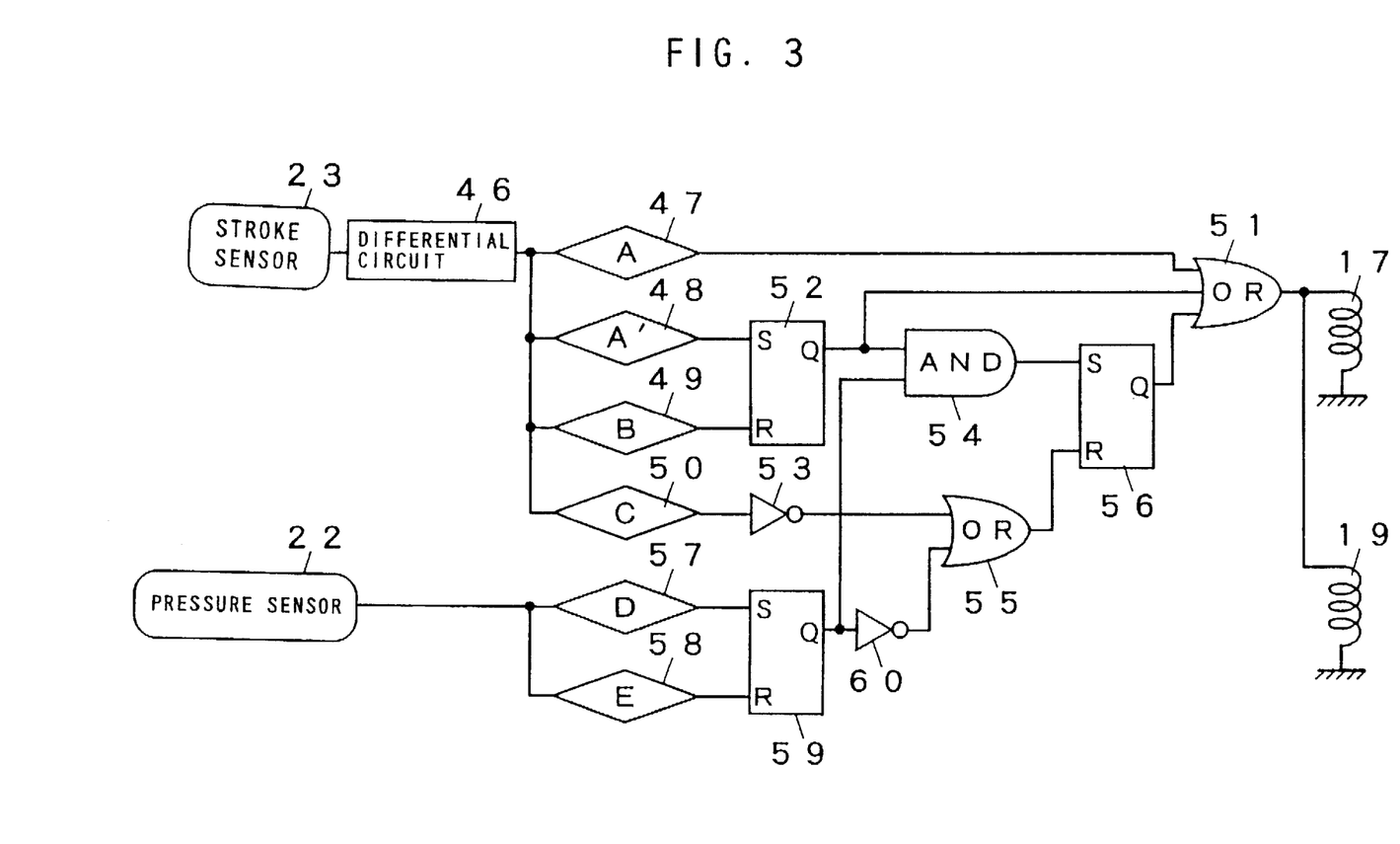
FIG. 3 is a view showing an example of an electronic control circuit for controlling emergency braking in the brake system of the embodiment according to the present invention.

FIG. 3 is a view showing an example of a circuit for operating the first and the second switching valves, that is, controlling emergency braking. As shown in FIG. 3, the stroke sensor 23 is connected to a differential circuit 46 where the pedaling speed is calculated by differentiating the traveling range of the pedal detected by the stroke sensor 23. The differential circuit 46 is connected to first, second, third and fourth comparators 47, 48, 49, and 50 which have first, second, third and fourth thresholds A, A', B, and C, respectively, for comparing with the actual pedaling speed. Among the thresholds A through C, the first threshold A is set to be the largest value, the second threshold A' and the third threshold B are set to be gradually reduced values, and the fourth threshold C is set to be the smallest value (i.e. A>A'>B>C).

The first threshold A in the first comparator 47 is set to be a value (e.g. 300 mm/sec.) corresponding to quite high pedaling speed on the brake pedal, e.g. for emergency braking. The first comparator 47 is connected to a first OR circuit 51 so as to output to the first OR circuit 51 when the pedaling speed is higher than the first threshold A.

The second threshold value A' in the second comparator 48 is set to be a value (e.g. 250 mm/sec.) less than the first threshold A. The second comparator 48 is connected to one of input terminals S of a first RS flip-flop circuit 52 so as to output to the input terminal S of the first RS flip-flop circuit 52 when the pedaling speed exceeds the second threshold A' and is still less than the first threshold A.

The third threshold B in the third comparator 49 is set to be a value (e.g. 200 mm/sec) less than the second threshold value A'. The third comparator 49 is connected to the other input terminal R of the first RS flip-flop 52 so as to output to the input terminal R of the first RS flip-flop 52 when the pedaling speed exceeds the third threshold B and is still less than the second threshold A'.

The fourth threshold C in the fourth comparator 50 is set to be a value (e.g. −50 mm/sec) corresponding to the release motion of the brake pedal 2 to determine the cancellation of the emergency braking. The fourth comparator 50 is connected to a first NOT circuit 53 so as to outputs to the first NOT circuit 53 when the pedaling speed is less than the fourth threshold C.

An output terminal Q of the first RS flip-flop 52 is connected to the first OR circuit 51 and an AND circuit 54 so that the output of the first RS flip-flop 52 is transmitted to the first OR circuit 51 and the AND circuit 54, respectively. The first NOT circuit 53 is connected to a second OR circuit 55 so that the output of the first NOT circuit 53 is transmitted to the second OR circuit 55.

The AND circuit 54 is connected to one of input terminals S of a second RS flip-flop 56 so that the output of the AND circuit 54 is transmitted to the input terminal S of the second RS flip-flop 56. The second OR circuit 55 is connected to the other input terminal R of the second RS flip-flop 56 so that the output of the second OR circuit 55 is transmitted to the other input terminal R of the second RS flip-flop 56.

An output terminal Q of the second RS flip-flop 56 is connected to the first OR circuit 51 so that the output of the second RS flip-flop 56 is transmitted to the first OR circuit 51. The first OR circuit 51 is connected to the solenoids of the first and second switching valves 17, 19 so that the first and second switching valves 17, 19 are controlled according to the output of the first OR circuit.

On the other hand, the pressure sensor 22 is connected to fifth and sixth comparators 57, 58. The fifth comparator 57 is provided with a fifth threshold D therein which is set to be a value (e.g. 5 kg) corresponding to quite large pedal pressure on the brake pedal, e.g. for emergency braking. The fifth comparator 57 is connected to one of input terminal S of a third RS flip-flop 59 so as to output to the input terminal S of the third RS flip-flop 59 when the pedal pressure exceeds the fifth threshold D.

The sixth comparator 58 is provided with a sixth threshold E therein which is set to be a valve (e.g. 3 kg) corresponding to the pedal pressure during service braking. The sixth comparator 58 is connected to the other input terminal R of the third RS flip-flop 59 so as to output to the other input terminal R of the third RS flip-flop 59 when the pedal pressure exceeds the sixth threshold E and is still less than the fifth threshold D.

An output terminal Q of the third RS flip-flop 59 is connected to the AND circuit 54 and a second NOT circuit 60, respectively, so that the output of the third RS flip-flop 59 is transmitted to the AND circuit 54 and the second NOT circuit 60, respectively. The second NOT circuit 60 is connected to the second OR circuit 55 so that the output of the second NOT circuit 60 is transmitted to the second OR circuit 55.

In the brake system 1 of this embodiment as structured above, when the brake is in non-operation as shown in FIG. 1 and FIG. 2, the air valve 39a is closed, the vacuum valve 39b is opened, the first switching valve 17 is opened, and the second switching valve 19 is closed. Therefore, the both constant pressure chambers 30, 34, the both variable pressure chambers 31 and 35, and inner chamber 37 are all in the vacuumed state.

During service braking, the input shaft 25 is advanced by pedaling the brake pedal 2 to close the vacuum valve 39b and open the air valve 39a. The atmospheric air is introduced into the rear variable pressure chamber 35 through the opened air valve 39a, the ring-like space, formed between the air valve 39a and the vacuum valve 39b, and the fourth variable pressure path 41 and introduced into the front variable pressure chamber 31 through the fifth variable pressure path 42. As a result of this, pressure differentials are produced between the front and the back of the front diaphragm 32 and between the front and the back of the rear diaphragm 36, thereby advancing the front diaphragm 32, a front power piston 29, the rear diaphragm 36, and a rear power piston 33. Therefore, the output shaft 44 is also advanced to actuate the piston of the master cylinder 4. At this point, the atmospheric air introduced into the rear variable pressure chamber 35 is about to flow out through the third variable line 20. However, since the check valve 21 prevents air flow from the rear variable pressure chamber 35 toward the vacuum source 15, the atmospheric air in the rear variable pressure chamber 35 is securely prevented from flowing out. Therefore, the vacuum booster 3 outputs without losing pressures.

In this case, the brake pedal 2 is pedaled for service braking, the pedaling speed is less than the third threshold B and the pedal pressure is less than the sixth threshold E. As a result, none of the first thorough sixth comparators 47, 48, 49, 50, 57, 58 outputs so that the first OR circuit 51 does not output. Therefore, the first and second switching valves do not work so that the atmospheric air is not introduced into the rear variable pressure chamber 35 through the second, first, and third variable pressure lines 18, 16, and 20. Then, the vacuum booster 3 provides an output force only according to the atmospheric air introduced into the variable pressure chamber 31, 35 through the air valve 39a of the control valve 39.

The master cylinder 4 develops brake fluid pressures in the two fluid chambers by the operation of the piston. The brake fluid pressure in one of the fluid chambers is supplied to the rear wheel cylinders 6, 7 for the rear wheels through the fluid pressure line 5 to actuate service braking of the rear wheels. The brake fluid pressure in the other fluid chamber is supplied to the front wheel cylinders 9, 10 for the front wheels through the right and left fluid pressure lines 8a, 8b to actuate service braking of the right and left front wheels.

The air valve 39a is gradually closed by the forward movements of the front diaphragm 32, the front power piston 29, the rear diaphragm 36, and the rear power piston 33. When the air valve 39a and the vacuum valve 39b are both closed, the forward movements of the front diaphragm 32, the front power piston 29, the rear diaphragm 36, and the rear power piston 33 are stopped. Therefore, the input from the input shaft 25 is increased at a predetermined servo ratio by the vacuum booster 3.

Upon releasing the brake pedal 2, the input shaft 25 returns to open the vacuum valve 39b. Accordingly, the atmospheric air in the front and the rear variable pressure chambers 31, 35 flows to the vacuum source 15 through the fifth variable pressure path 42, the fourth variable pressure path 41, the ring-like space formed between the air valve 39a and the vacuum valve 39b, the opened vacuum valve 39b, the sixth variable pressure path 43, the inner chamber 37, and the first variable pressure chamber line 16. By the return movements of the front diaphragm 32, the front power piston 29, the rear diaphragm 36, and the rear power piston 33, the output shaft 44 and the piston of the master cylinder 4 also return to cancel the braking. After that, the brake system is in a non-operating state as shown in FIG. 1 and FIG. 2.

The description will now be made as regard to a case where the driver pedals the brake pedal 2 at a pedaling speed exceeding the first threshold A for emergency braking with high risk of vehicle collision. In this case, traveling of the brake pedals causes the vacuum valve 39b to close and the air valve 39a to open, thereby introducing the atmospheric air into the variable pressure chambers 31, 35. Therefore, the vacuum booster 3 outputs so that the master cylinder 4 develops the brake fluid pressure, actuating the brake.

In such a case, the pedaling speed calculated based on the pedal stroke detecting signal from the stroke sensor 23 exceeds the first threshold A so that the first comparator 47 in the controller 24 outputs. The output of the first comparator 47 is transmitted to the first OR circuit 51 which then outputs to make the first switching valve 17 close and make the second switching valve 19 open simultaneously, thereby shutting off the communication between the first variable pressure path 16 at the vacuum booster 3 side and the vacuum source 15 and allowing the flow of the atmospheric air into the first variable pressure line 16 through the second variable pressure line 18. Therefore, the atmospheric air is introduced into the rear variable pressure chamber 35 through the second variable pressure line 18, the first variable pressure line 16, the third variable pressure line 20, and the check valve 21, and introduced into the front variable pressure chamber 31 from the rear variable pressure chamber 35 through the fifth variable pressure path 42. Thus, the increasing rate of the pressures in the variable pressure chambers 31, 35 is higher than the rate corresponding to the pedaling speed so that the master cylinder 4 develops higher brake fluid pressure all at once, thereby outputting larger braking force. In this manner, the shortage of the braking force is reliably compensated for emergency braking so as to prevent the vehicle from coming into collision.

Because of the increase in the braking force, it is possible that the wheels are locked. In this embodiment, a conventional anti-skid controller (not shown) acts in such a case. As the anti-skid controller detects a tendency of a wheel lock based on signals from the wheel speed sensors, the anti-skid controller actuates the ABS 11 to control the brake fluid pressures of the wheel cylinders 6, 7, 9, 10 to avoid the tendency of the wheel lock.

The description will now be made as regard to a case where the driver pedals the brake pedal 2 at a pedaling speed exceeding the second threshold A', which is too fast for service braking even when the vehicle is not likely to come into collision, and with a pedal pressure less than the sixth threshold E. In this case, the vacuum booster 3 develops the braking force by the atmospheric air introduced through the air valve 39a similarly to the case of service braking as described above. On the other hand, since the pedaling speed exceeds the second threshold A', the second comparator 48 outputs. The output of the second comparator 48 is transmitted to the first RS flip-flop 52 which then outputs to the AND circuit 54. However, since the pedal pressure is less than the sixth threshold E, the fifth comparator 57 does not output and therefore the third RS flip-flop 59 does not output, that is, the AND circuit 54 receives nothing from the third RS flip-flop 59. Consequently, the AND circuit 54 does not output and therefore the second RS flip-flop 56 does not output, that is, the first OR circuit 51 receives nothing from the second RS flip-flop 56 and the first comparator 47.

On the other hand, the first OR circuit 51 receives the output from the first RS flip-flop 52 because of the pedaling speed exceeding the second threshold A', so that the first and second switching valves 17, 19 are change. Since the second RS flip-flop 56 does not output, when the pedaling speed is less than the third threshold B, the output of the first RS flip-flop 52 is stopped immediately. At this point, the output of the first OR circuit 51 is stopped and the first and second switching valves 17, 19 are switched again and return to the normal state. In this manner, the vacuum booster 3 produces an output only according to the atmospheric air introduced into the variable pressure chambers 31, 35 through the air valve 39a of the control valve 39.

In this manner, a braking force for emergency braking is not developed even when the driver does not intend to brake for emergency braking but pedals the brake pedal at a relatively high pedaling speed. Therefore, the brake system does not forcibly develop an undesirable braking force even when a veteran driver pedals the brake pedal at a high pedaling speed for passing through the range of loss stroke. That is, the condition that the second RS flip-flop 56 does not output does not make the emergency braking in the holding mode.

The description will now be made as regard to a case where the driver pedals the brake pedal 2 at a pedaling speed exceeding the second threshold A' and with pedal pressure exceeding the fifth threshold D for rapid braking than service braking. In this case, the vacuum booster 3 develops the braking force by the atmospheric air introduced through the air valve 39a similarly to the case of service braking as described above. On the other hand, since the pedaling speed exceeds the second threshold A', the second comparator 48 outputs, so that the first RS flip-flop 52 also outputs to the AND circuit 54. Additionally, since the pedal pressure exceeds the fifth threshold D, the fifth comparator 57 outputs, so that the third RS flip-flop 59 also outputs. The AND circuit 54 receives the output from the third RS flip-flop 59 and therefore outputs to the second RS flip-flop 56 which then outputs. The first OR circuit 51 then receives the output of the second RS flip-flop 56, thereby operating the first and second switching valves 17, 19. The atmospheric air is introduced into the rear variable pressure chamber 35 through the second, first and third variable pressure lines 18, 16, and 20. Thus, the vacuum booster 3 produces an output by the atmospheric air introduced by way of the second, first and third variable pressure lines 18, 16, and 20 in addition to the atmospheric air introduced into the variable pressure chambers 31, 35 through the air valve 39a of the control valve 39.

In this manner, a braking force for emergency braking is forcibly developed when the driver intends to brake for emergency braking and pedals the brake pedal at a relatively high pedaling speed.

When the driver judges that the emergency braking is not necessary, the driver releases the pedaling force exerted on the brake pedal 2 to return the pedal stroke and decrease the pedal pressure in the pressure sensor. As the output from the pedal stroke sensor 23 is less than the fourth threshold C, the first NOT circuit 53 outputs a Hi signal to the second OR circuit 55. Alternatively, as the output from the pressure sensor 22 is less than the sixth threshold E, the second NOT circuit 60 outputs a Hi signal by way of the third RS flip-flop 59 to the second OR circuit 55.

The output of the second OR circuit 55 is transmitted to the input terminal R of the second RS flip-flop 56 to cancel the holding mode of the emergency braking. This returns the brake system to the service braking. The OR of a minus stroke detected by the stroke sensor 23 and the threshold E of the pressure sensor 22 reliably makes a proper decision that the driver intends to release the brake. Therefore, the brake system enables the emergency braking to be released without incommodity and enables the switching from the emergency braking to the service braking.

Though the forced braking by the brake system helps a general driver or a beginner to securely output a braking force for emergency braking, a veteran driver is likely to feel a little discomfort with the forced braking. That is, the braking feeling with the forced braking is not always comfortable for a veteran driver. Therefore, the brake system is provided with a cancel switch 61 for canceling the forced braking as shown in FIG. 1. The cancel switch 61 is connected to the controller 24 which is connected to an indicator 62 for indicating the operable state of the forced braking to the driver. The driver can select the operable state or the canceled state of the forced braking by operating the cancel switch 61 and can know whether the forced braking is operable or not because the indicator 62 indicates the operable state of the forced braking when the driver selects the operable state.

Figure 4:
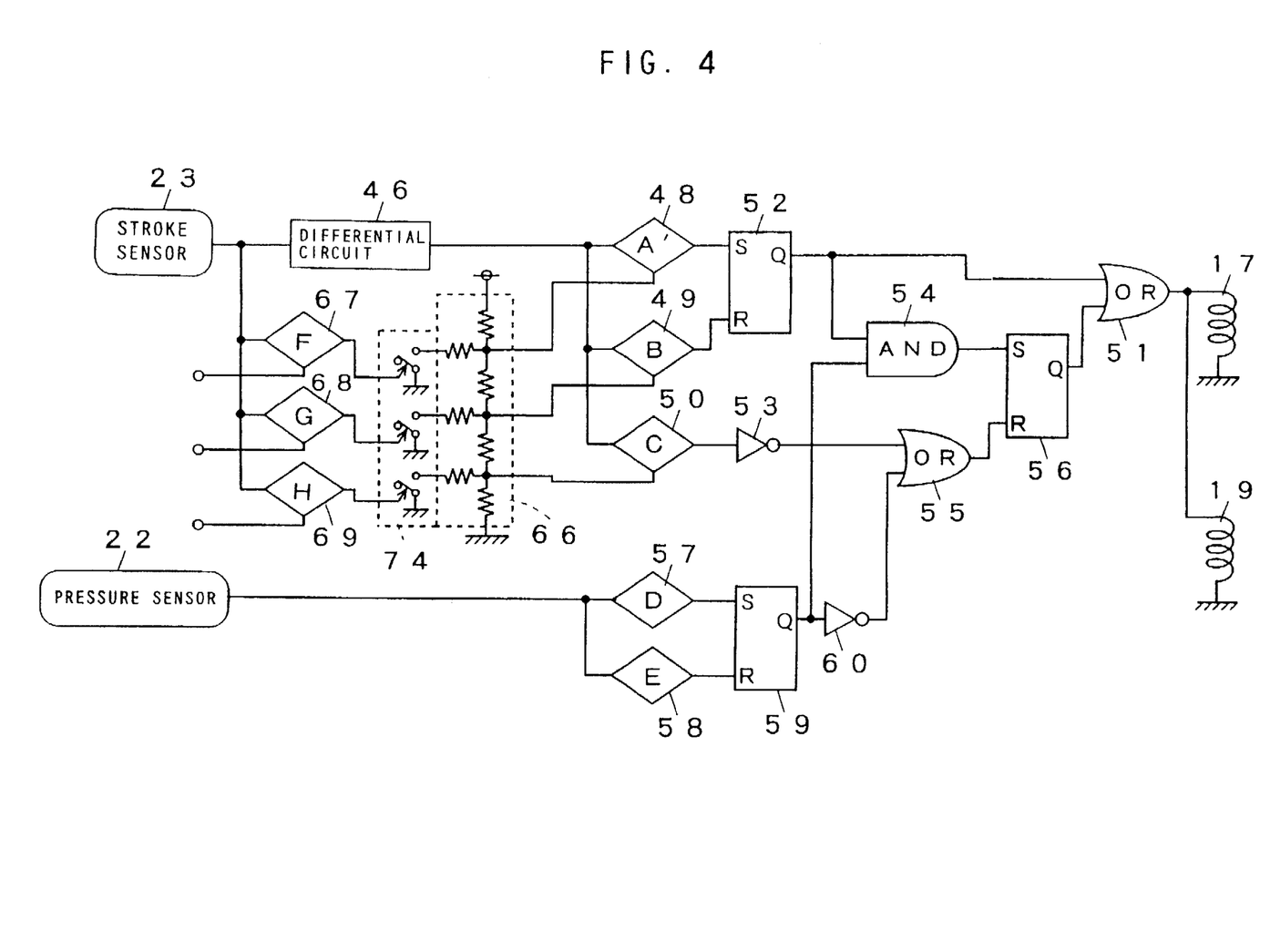
FIG. 4 is a view showing another example of an electronic control circuit for controlling emergency braking in the brake system of the embodiment according to the present invention.

FIG. 4 is a view showing another example of a circuit for operating the first and the second switching valves 17 and 19, that is, controlling emergency braking. It should be noted that the same components as that of the control circuit shown in FIG. 3 are marked with the same reference numerals, respectively, so that the detailed description about the same components will be omitted.

The control circuit shown in FIG. 3 operates the first and second switching valves 17, 19 according to the pedaling speed and/or the pedal pressure and the thresholds of the pedaling speed are invariable regardless of the stroke position of the brake pedal 2. In the control circuit shown in FIG. 4, however, the first threshold A is abolished and the second, third and fourth thresholds A', B, and C are variable corresponding to the stroke position of the brake pedal 2.

The control circuit shown in FIG. 4 is provided with seventh, eighth and ninth comparators 67, 68, and 69 which outputs in response to a stroke detecting signal of the brake pedal 2 from the stroke sensor 23. The seventh, eighth and ninth comparators 67, 68, and 69 have seventh, eighth and ninth thresholds F, G, and H therein, respectively.

The seventh threshold F in the seventh comparator 67 is set to be a value (e.g. 40 m/m from the unloaded position of the brake pedal) corresponding to a relatively small stroke position of the brake pedal 2. The seventh comparator 67 is connected to one of input terminals of a resistance regulator 66 to output to one of electric switches 74 of the resistance regulator 66 when the traveling range of the pedal is less than the seventh threshold F.

The eighth threshold G in the eighth comparator 68 is set to be a value (e.g. 50 m/m from the unloaded position) greater than the seventh threshold F. The eighth comparator 68 is connected to another one of the input terminals of the resistance regulator 66 to output to another one of the electric switches 74 of the resistance regulator 66 when the traveling range of the pedal is less than the eighth threshold G and exceeds the seventh threshold F. Furthermore, the ninth threshold H in the ninth comparator 69 is set to be a value (e.g. 60 m/m from the unloaded position) greater than the eighth threshold G. The ninth comparator 69 is connected to another one of the input terminals of the resistance regulator 66 to output to another one of the electric switches 74 of the resistance regulator 66 when the traveling range of the pedal is less than the ninth threshold H and exceeds the eighth threshold G.

The electric switches 74 are actuated by output signals from the seventh, eighth and ninth comparators 67, 68, 69, respectively, to earth the corresponding input terminal of the resistance regulator 66. Output terminals of the resistance regulator 66 are connected to the second, third and fourth comparators 48, 49, and 50, respectively. Therefore, the second, third and fourth thresholds A', B, and C of the second, third and fourth comparators 48, 49, and 50 are variable in response to the traveling range of the brake pedal 2.

The respective thresholds of the pedaling speed are variable in response to the traveling range of the brake pedal 2 as mentioned above, thereby enabling more accurate control of emergency braking according to the different skill of the driver. The pedaling speed of the brake pedal 2 may change according to the traveling range of the brake pedal 2 since the reaction force is increased as the traveling range is larger. In particular, for a beginner who can not pedal the brake pedal 2 fully to the maximum when emergency braking is required, the pedaling speed significantly changes according to the traveling range. Therefore, by making the threshold of the pedaling speed variable, the controller can more accurately control the emergency braking even if the pedaling speed changes according to the traveling range.

Figure 5:
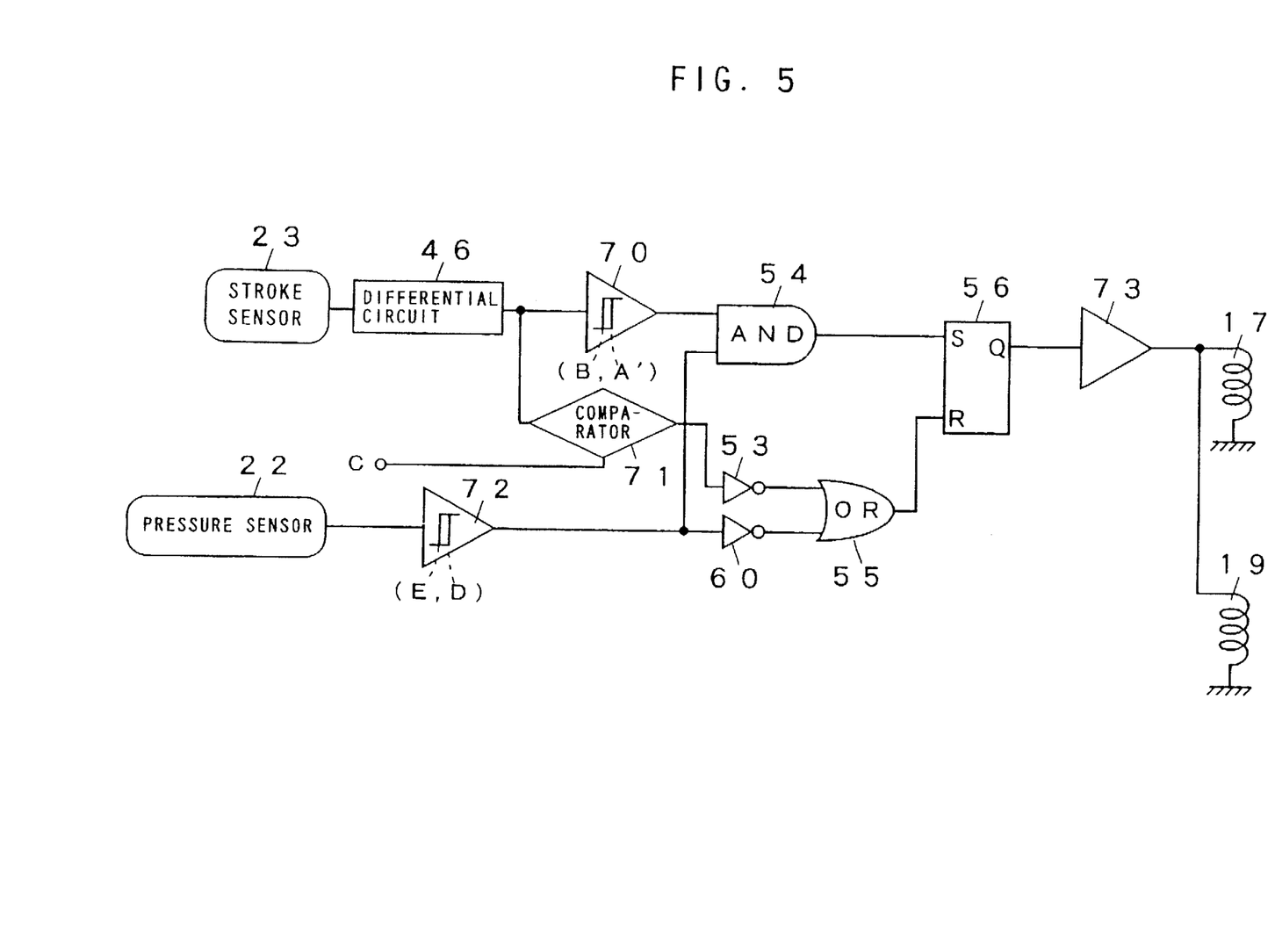
FIG. 5 is a view showing a further different example of an electronic control circuit for controlling emergency braking in the brake system of the embodiment according to the present invention.

FIG. 5 is a view showing a different example of a circuit for operating the first and the second switching valves 17 and 19, that is, controlling emergency braking. It should be noted that the same components as those of the control circuit shown in FIG. 3 are marked with the same reference numerals, respectively, so that the detailed description about the same components will be omitted.

The control circuit shown in FIG. 3 is provided with the second through sixth comparators 48, 49, 50, 57, and 58 and the second and third RS flip-flops 52 and 59. In this example, the second through sixth comparators 48, 49, 50, 57, and 58 and the second and third RS flip-flops 52 and 59 are abolished and the control circuit is provided with first and second Schmitt circuits 70 and 72 and a tenth comparator 71 as shown in FIG. 5. The first Schmitt circuit 70 has second and third thresholds A' and B of the pedaling speed therein and the tenth comparator 71 has a fourth threshold C of the pedaling speed therein. In addition, the second Schmitt circuits 72 has fifth and sixth thresholds D and E of the pedal pressure therein.

While the control circuit exhibits the same effect as the control circuit shown in FIG. 3, the number of components is reduced, thereby allowing the simple structure and the lower cost.

Figure 6:
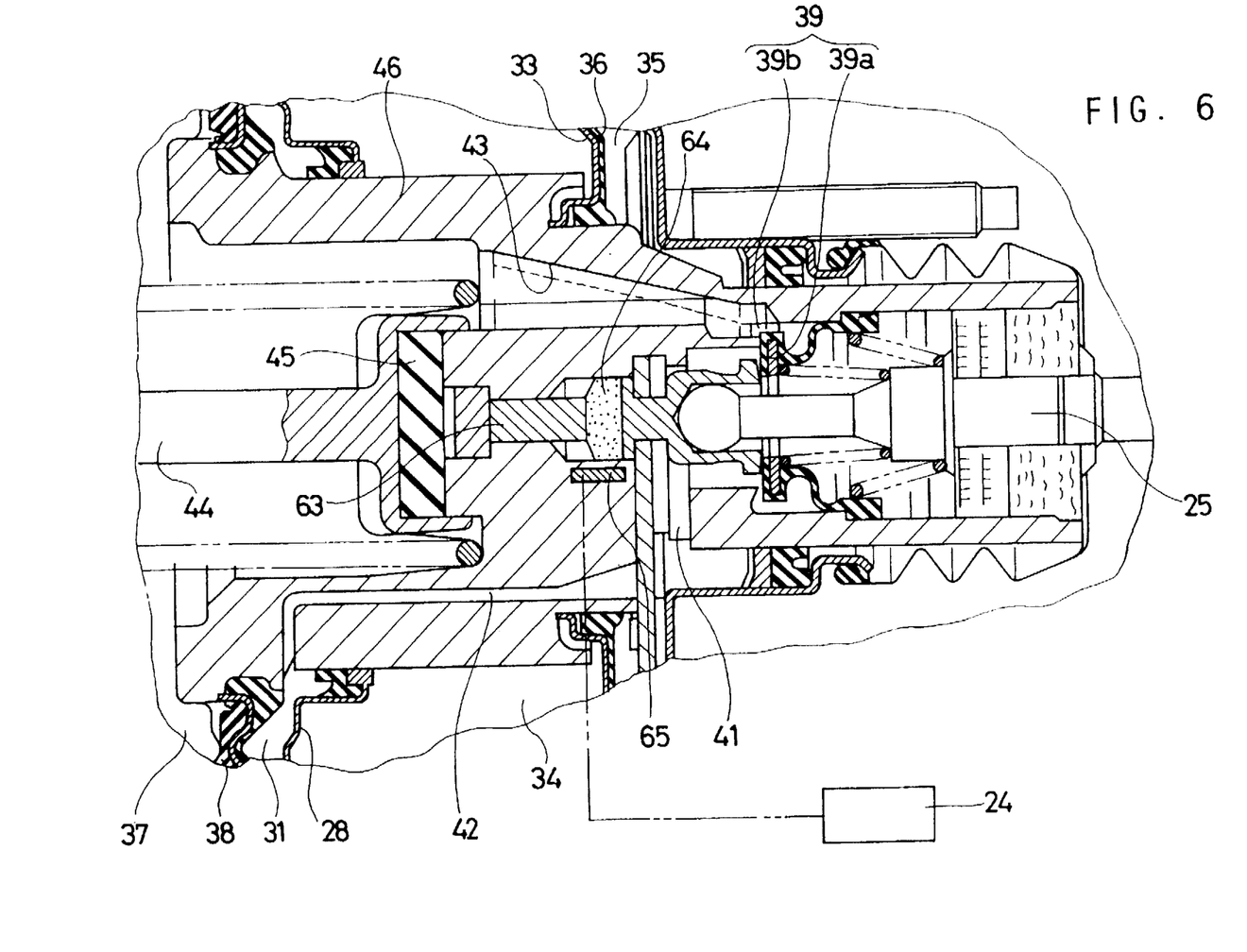
FIG. 6 is a sectional view partly showing a vacuum booster of a different embodiment according to the present invention.

Instead of the pressure sensor 22 disposed on the brake pedal 2, the brake system may have a permanent magnet 64 disposed on a valve plunger 63 slidably inserted into a valve body 46 as shown in FIG. 6 and a sensor 65, such as a magneto-resistance element and Hall element, disposed facing the permanent magnet 64 for detecting the displacement of the permanent magnet 64. The small relative displacement on the valve plunger 63 is detected by the sensor 65 to detect the pedal pressure on the brake pedal 2. In this case, since the detected value of the sensor 65 corresponds to the difference between the input and the output of the booster, the pedal pressure is calculated by integrating the detected value. However, instead of the pedal pressure, the detected signal of the sensor 65 in the valve may be used for controlling the first switching valve 17 and the second switching valve 19.

A three-way solenoid valve may be used instead of the first switching valve 17 and the second switching valve 19.

Though the present invention is applied to a dual circuit brake system in the aforementioned embodiments, the present invention may be applied to a single circuit brake system. Moreover, the vacuum booster 3 may be a single type vacuum booster.

In addition to the aforementioned embodiments, a microcomputer in which the control circuit is digitized may be used.

As apparent from the above description, since the controller decides the operation for emergency braking based on the operational speed of the brake controlling member and the operational force of the brake controlling member according to the present invention, the electronic controller does not decide that the pedaling for emergency braking is operated when the driver such as a veteran driver pedals at a relatively high pedaling speed to quickly pass through the range of loss stroke even for service braking, thereby preventing undesirable emergency braking. Therefore, the brake system more securely develops the braking force for emergency braking.

Since the threshold of the speed is variable in response to the traveling range of the brake controlling member according to the present invention, even if the operational speed changes according to the traveling range of the brake controlling member, the controller can more accurately control the pressure switching valve corresponding to the changes of the operational speed. The controller helps a driver, who can not securely operate the brake controlling member to the maximum due to the increment of the reaction corresponding to the displacement of the brake controlling member, to securely develop braking force for emergency braking.

According to the present invention, even when the brake controlling member is still in operation, the emergency braking can be securely canceled when the operating force exerted on the brake controlling member is less than the second operating force threshold. Therefore, the braking feeling is improved so that even a veteran driver operates the brake controlling member without incommodity.

According to the present invention, the driver operates the cancel switch to enable the brake control to adapt the driver's will, thereby improving the driving feeling.

Furthermore, according to the present invention, the driver can securely know whether the controller in the brake system is operable by the indicator.

What we claim is:

1. A brake system comprising:
   a brake controlling member;
   a vacuum booster comprising a constant pressure chamber inside of which is always vacuumed by a vacuum source, a variable pressure chamber inside of which is vacuumed when a brake is in non-operation and into which atmospheric air is introduced when the brake is in operation, a diaphragm which separates said constant pressure chamber and said variable pressure chamber and is actuated by the atmospheric air introduced in said variable pressure chamber, an inner chamber inside of which is normally vacuumed and into which the atmospheric air is introduced alternatively if necessary, a control valve which is controlled by said brake controlling member so that said variable pressure chamber is allowed to communicate with the inner chamber and not allowed to communicate with the atmospheric air when the brake is in non-operation, and said variable pressure chamber is allowed to communicate with the atmospheric air and not allowed to communicate with the inner chamber when the brake is in operation, and an output shaft which is actuated by said diaphragm;
   a master cylinder which is actuated by said output shaft of said vacuum booster to develop brake fluid pressure;
   brake cylinders into which the brake fluid pressure of said master cylinder is introduced to produce a braking force;
   a first path which is communicated with said inner chamber;
   a pressure switching valve which normally allows said first path to communicate with said vacuum source and allows said first path to communicate with the atmospheric air if necessary;
   a second path for introducing the atmospheric air passing through said first path to said variable pressure chamber;
   a check valve which is disposed in said second path to allow air from said first path to said variable pressure chamber and not allow air from said variable pressure chamber to said first path;
   a displacement sensor for detecting displacement of said brake controlling member;
   a force sensor for detecting an operating force exerted on said brake controlling member; and
   an electronic controller for operating said pressure switching valve when an operating speed computed based on said displacement detected by said displacement sensor is greater than a predetermined speed threshold and said operating force detected by said force sensor is greater than a predetermined force threshold, wherein said electronic controller operates said pressure switching valve to allow said first path to communicate with the atmospheric air when emergency braking is required so as to increase said braking force.

2. A brake system as claimed in claim 1, wherein said speed threshold comprises a plurality of thresholds to respond to a traveling range of said brake controlling member.

3. A brake system as claimed in claim 2, wherein said force threshold comprises a first force threshold as a reference value for said electronic controller to operate said pressure switching valve and a second force threshold as a reference value for said electronic controller to cancel an operation of said pressure switching valve.

4. A brake system as claimed in claim 3, further comprising a cancel switch connected to said electronic controller for canceling an operation of said electronic controller, wherein an operational signal outputted from said cancel switch to said electronic controller determines whether said electronic controller is or not.

5. A brake system as claimed in claim 4, further comprising an indicator for indicating that said electronic controller operates said pressure switching valve.

6. A brake system as claimed in claim 2, further comprising a cancel switch connected to said electronic controller for canceling an operation of said electronic controller, wherein an operational signal outputted from said cancel switch to said electronic controller determines whether said electronic controller is actuated or not.

7. A brake system as claimed in claim 6, further comprising an indicator for indicating that said electronic controller operates said pressure switching valve.

8. A brake system as claimed in claim 1, wherein said force threshold comprises a first force threshold as a reference value for said electronic controller to operate said pressure switching valve and a second force threshold as a reference value for said electronic controller to cancel an operation of said pressure switching valve.

9. A brake system as claimed in claim 8, further comprising a cancel switch connected to said electronic controller for canceling an operation of said electronic controller, wherein an operational signal outputted from said cancel switch to said electronic controller determines whether said electronic controller is actuated or not.

10. A brake system as claimed in claim 9, further comprising an indicator for indicating that said electronic controller operates said pressure switching valve.

11. A brake system as claimed in claim 1, further comprising a cancel switch connected to said electronic controller for canceling an operation of said electronic controller, wherein an operational signal outputted from said cancel switch to said electronic controller determines whether said electronic controller is actuated or not.

12. A brake system as claimed in claim 11, further comprising an indicator for indicating that said electronic controller operates said pressure switching valve.

13. A brake system as claimed in claim 1, wherein said electronic controller further includes an additional speed threshold and an additional force threshold so that when the electronic controller detects at least one of the additional speed threshold and the additional force threshold after the emergency braking, the pressure switching valve is switched such that the first path communicates the vacuum source.

14. A brake system as claimed in claim 13, wherein said pressure switching valve includes first and second switching valves, said first switching valve being opened and said second switching valve being closed in a condition other than the emergency braking to allow the first path to communicate with the vacuum source, and said first switch valve being closed and said second switching valve being opened at the emergency braking.

* * * * *